3,435,051
CYCLIZATION OF SUBSTITUTED PROPARGYL UREAS TO 2-IMIDAZOLONE DERIVATIVES

Enos Charles Pesterfield, Jr., Briarcliff Manor, N.Y., assignor to Geigy Chemical Corporation, Greenburgh, N.Y., a corporation of Delaware
No Drawing. Filed Sept. 1, 1965, Ser. No. 484,469
Int. Cl. C07d 49/36; A61k 27/00
U.S. Cl. 260—309.6         8 Claims

ABSTRACT OF THE DISCLOSURE 1,5-substituted-3-acetyl-2-imidazolones optionally substituted in the 4-position are prepared by cyclization of N-mono-substituted-N'-propargyl ureas under the catalytic influenece of mercuric acetate. The compounds are useful as analgesics, antipyretics, anti-inflammatories, and CNS depressants.

Detailed description

This invention relates to the production of 1,4,5-substituted-2-imidazolones and is more particularly concerned with the production of such compounds by cyclization and rearrangement of N-monosubstituted-N'-propargyl ureas with concomitant double-bond isomerization. It also relates to certain novel cyclized intermediate products.

The preparation of various 2-imidazolone derivatives by use of assorted catalytic methods is shown in the prior art. Thus, as described in Japanese Patent 12,940 published July 8, 1964, 3-butynylurea or propargylurea is treated with a concentrated strong acid (e.g., $H_2SO_4$) to bring about ring closure and produce 2-imidazolone derivatives having the formula

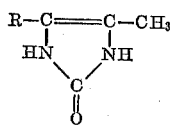

in which R is H or $CH_3$. Similarly, Stoffel and Speciale have described a series of ring closures by treating various substituted propynylureas with phosphorous pentachloride, Jour. Org. Chem. 27, 3079 (1962). This latter publication aptly emphasizes the unpredictability of these catalytic reactions, by pointing out (page 3080) that the reactions are general except that, when one of the N atoms of the urea group is unsubstituted, ring closure is not obtained.

Many of these cyclization reactions described in the prior art are essentially laboratory processes which are not suitable for commercial adaptation even though relatively high yields of the desired products may sometimes be obtained. It is well known that, in such catalytic operations, maximum yield is not always the major consideration for practical large-scale use. More frequently, moderate to good yields are more economically sound, from a commercial standpoint, dependent on cost and availability of raw materials, nature and conditions of operations, recovery of finished products and the like.

The present invention provides a rapid and cheap process for the commercial synthesis of 1,4,5-substituted-2-imidazolones by cyclization of N-monosubstituted-N'-1,3-substituted-propargyl ureas by using mercuric acetate as the catalyst and carrying out the reaction in a suitable solvent to form an intermediate $N_3$-acetyl compound (II) which is then reacted with an aqueous base to form corresponding compound III. The reaction proceeds according to the following equation:

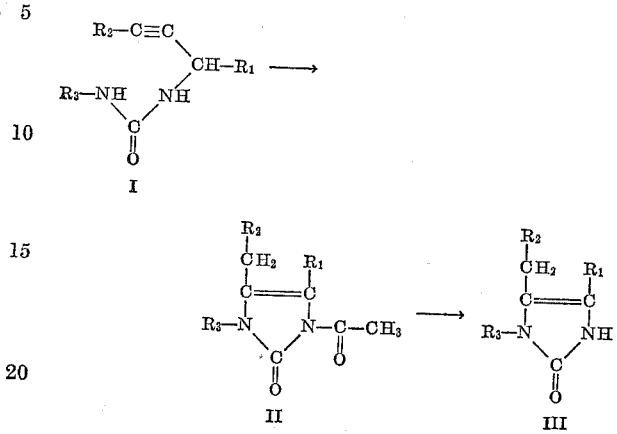

in which $R_1$=H or lower alkyl, $R_2$=H or lower alkyl and $R_3$=aliphatic, cycloalkyl, aralkyl or aryl groups. More specifically, in compounds of the formulas, $R_3$ is an aliphatic group, such as, an alkyl group having up to 12 carbon atoms, viz., methyl, ethyl, n-propyl, isopropyl, n-butyl, n-hexyl, n-octyl, n-dodecyl, etc. or a lower alkenyl group such as, vinyl, allyl, methallyl, etc., or an ω,ω-di-(lower)alkoxy(lower)alkylene group such as, dimethoxyethyl, dimethoxypropyl, bisethoxyethyl, bisethoxypropyl, etc., or an ω-amino(lower)alkyl group, such as, a di(lower)alkylamino(lower)alkyl group, viz., dimethylaminoethyl, diethylaminopropyl, etc., or an N-heterocyclic substituted (lower)alkyl group, viz., 2-(N-hexamethyleneimino)-ethyl, 3-(N-pyrrolidino)propyl, 2-(N-piperidino)ethyl, etc.; or an aralkyl group, such as, benzyl, phenethyl, phenpropyl, etc., or an aryl group, such as, phenyl, biphenyl or naphthyl, etc. These aralkyl or aryl groups can carry, for example, from one to three of the following ring substituents: halogen, such as, fluorine, chlorine or bromine; trifluoromethyl; lower alkyl; lower alkenyl; lower alkoxy(lower)alkyl; hydroxy; lower alkoxy, preferably, methoxy; carboxy; lower carbalkoxy; lower alkanoyl, preferably acetyl; lower acyloxy, preferably acetoxy; cyano; nitro; amino; lower acylamido, preferably acetamido; lower dialkylamino; lower dialkylamino(lower)alkyl or lower alkylmercapto. A methylenedioxy substituent is also within the purview of the inventive concept.

The term "lower" as used herein in connection with definitions of substituents, signifies that the groups in question have a carbon content of $C_1$ to $C_6$ and are inclusive of straight chains and branched chains.

The following examples are typical of the reaction which is not limited to the specific details set forth. Temperatures are centigrade and parts are by weight.

A mixture of 20 parts of N-phenyl-N'-propargyl urea and 0.5 part mercuric acetate in 100 parts glacial acetic acid was refluxed for one hour to produce an acetic acid solution of $N_1$-phenyl-$N_3$-acetyl-5-methyl-2-imidazolone. This solution was cooled and poured into water, whereupon a white precipitate was obtained. The solid was collected, washed with water and dried in vacuo and 4 parts of white crystals, M.P. 190–195°, thus obtained. Recrystallization from ethanol gave a compound melting at 198–200°. The NMR of the substance clearly indicated that its structure was $N_1$-phenyl-$N_3$-acetyl-5-methyl-2-imidazolone. To hydrolyze this intermediate, 1.0 part thereof was dissolved in 20 parts of ethanol and 5 parts of 3 N NaOH added. The mixture was refluxed on the steam bath for 1–2 hours. After cooling, ethanol was removed under reduced pressure, water added and the mixture extracted with chloroform. The combined CHCl₃ extracts were dried over Na₂SO₄ and the solvent removed in vacuo. The residue, crystallized from ethanol, was 1-phenyl-5-methyl-2-imidazolone, M.P. 214.5–216°.

Similarly, N(p-methoxyphenyl)-N'-propargyl urea was substituted for the N-phenyl-N'-propargyl urea of the previous example and the intermediate formed was 1-p-methoxyphenyl - 3 - acetyl-5-methyl-2-imidazolone, M.P. 131°. This intermediate is hydrolyzed as described above, to give 1-(p-methoxyphenyl)-5-methyl - 2 - imidazolone, M.P. 193–195°.

Similarly, other corresponding 1,4,5 - substituted - 2-imidazolones (III) are obtained when other N-mono-substituted-N'-1,3-substituted propargyl ureas (I) are used in place of the substituted propargyl ureas of the examples. As illustrative, there may be mentioned those ureas (I) in which R₃ may represent p-methoxyphenyl, p-trifluoromethyl phenyl, chlorophenyl, p-tolyl, n-propyl, n-butyl, p-ethoxyphenyl, m-nitrophenyl, p-fluorophenyl, etc.

The cyclization reactions of this invention proceed smoothly and are easily controlled. The N'-substituted-N-1,3-substituted propargyl ureas are simple and cheaply preparade. Typically, a suitable substituted propargylamine is readily condensed with a suitably substituted isocyanate, in solution in a suitable solvent to form the desired substituted propargyl urea which may be cyclized as described herein. All of these factors contribute to provide an economical process suitable for large scale commercial operation in readily available equipment, with minimum controls.

The specific details of the present process are subject to considerable variation without departing from the scope and spirit of the invention. Thus, the ratio of the amount of catalyst to the amount of the substituted propargyl urea may range from about 1:25 to about 1:100 with about 1:40 to 1:50 being preferred. Instead of crystallizing the desired product from ethanol, one may use benzene, methanol, xylene, toluene, chlorobenzene, halogenated hydrocarbons such as chloroform, ethers such as diisopropyl ether, water and the like as the crystallization solvent. The aqueous base used for hydrolysis is preferably an alkali metal hydroxide, e.g., NaOH, KOH, etc.

The 1,4,5-substituted-2-imidazolones prepared in accordance with the present process possess valuable pharmacological properties and have been found to be useful as analgesics, antipyretics, anti-inflammatories, CNS depressants and the like. This class of compounds and the use of them as phramaceutical agents and intermediates in the synthesis of drugs has been described in the prior art.

The invention is subject to other suitable changes without departing from the spirit and scope thereof as defined in the appended claims.

What is claimed is:

1. A process for the preparation of a substituted-2-imidazolone of the formula

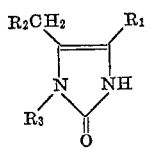

wherein
$R_1$ is hydrogen or lower alkyl of from 1 to 6 carbon atoms,
$R_2$ is hydrogen or lower alkyl of from 1 to 6 carbon atoms, and
$R_3$ is lower alkyl of from 1 to 6 carbon atoms, phenyl, or phenyl substituted by halogen, trifluoromethyl, lower alkyl, lower alkoxy, nitro, lower alkylmercapto or methylenedioxy which comprises cyclizing a N-monosubstituted-N'-1,3-substituted propargyl urea of the formula

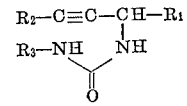

by heating said urea in glacial acetic acid and mercuric acetate, the mercuric acetate being present in a ratio of from 1:100 to 1:25 of the amount of the urea, until cyclization is substantially complete and, thereafter hydrolyzing the cyclized product with an aqueous alkali base.

2. The process of claim 1 wherein the aqueous alkali base is aqueous sodium hydroxide.

3. The process of claim 1 in which the catalyst: urea ratio is about 1:40 to 1:50.

4. The process of claim 1 in which $R_1$ and $R_2$ are H and $R_3$ is p-methoxyphenyl.

5. The process of claim 1 in which $R_3$ is phenyl and $R_1$ and $R_2$ are H.

6. A compound of the formula

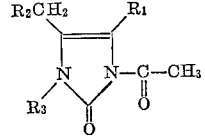

wherein
$R_1$ is hydrogen or lower alkyl,
$R_2$ is hydrogen or lower alkyl, and
$R_3$ is lower alkyl, phenyl or phenyl substituted by halogen, trifluoromethyl, lower alkyl, lower alkoxy, nitro, lower alkylmercapto or methylenedioxy.

7. The compound of claim 6 wherein $R_1$ is hydrogen, $R_2$ is hydrogen, and $R_3$ is phenyl.

8. The compound of claim 6 wherein $R_1$ is hydrogen, $R_2$ is hydrogen, and $R_3$ is p-methoxyphenyl.

References Cited

UNITED STATES PATENTS

| | | | |
|---|---|---|---|
| 2,397,250 | 3/1964 | Duschinsky | 260—309.6 |
| 2,707,186 | 4/1955 | Duschinsky | 260—309.6 |
| 3,136,776 | 6/1964 | Stoffel | 260—309.6 |

FOREIGN PATENTS 3,912,940  7/1964  Japan.

OTHER REFERENCES

Biltz Berichte, vol. 40, pp. 4799–4806 (1907).
Chemical Abstracts Decennial Index, vols. 1–10, Subject Index CR-K, p. 3323 (1907–16).
Fenton et al.: Chemical Abstracts, vol. 3, p. 2964 (1909).
Fenton et al.: Jour. Chem. Soc. (London), vol. 95, pp. 1329–34 (1909).
Stoffel et al.: Jour. Org. Chem., vol. 27, pp. 3079–83 (1962).

HENRY R. JILES, *Primary Examiner.*

NATALIE TROUSOF, *Assistant Examiner.*

U.S. Cl. X.R.

260—239, 294, 326.3, 553, 999